(12) United States Patent
Cittadini et al.

(10) Patent No.: US 7,121,060 B1
(45) Date of Patent: Oct. 17, 2006

(54) MOULDING ELEMENT FOR MOTOR VEHICLE BODIES AND METHOD FOR REALIZATION THEREOF

(75) Inventors: Paolo Cittadini, Luvinate (IT); Pierpaolo Ferrante, Cuvio (IT); Ralf Laudwein, Bardello (IT)

(73) Assignee: Industrie Ilpea SpA, Malgesso Varese (IT)

( * ) Notice: Subject to any disclaimer, the term of this patent is extended or adjusted under 35 U.S.C. 154(b) by 0 days.

(21) Appl. No.: 09/868,740

(22) PCT Filed: Dec. 23, 1998

(86) PCT No.: PCT/IT98/00378

§ 371 (c)(1),
(2), (4) Date: Jun. 19, 2001

(87) PCT Pub. No.: WO00/38952

PCT Pub. Date: Jul. 6, 2000

(51) Int. Cl.
*E04C 5/01* (2006.01)

(52) U.S. Cl. .................. 52/716.5; 52/211; 52/213; 52/416.6; 293/128

(58) Field of Classification Search .............. 52/716.5, 52/211, 213, 716.6, 716.7; 428/99, 122, 428/60; 24/289, 297; 293/128; 296/188, 296/291, 497, 187.01, 205
See application file for complete search history.

(56) References Cited

U.S. PATENT DOCUMENTS

| | | | | | |
|---|---|---|---|---|---|
| 4,011,635 | A | * | 3/1977 | Meyer | 24/73 |
| 4,066,285 | A | * | 1/1978 | Hall et al. | 296/62 |
| 4,216,637 | A | * | 8/1980 | Kraus | 52/718 |
| 4,386,799 | A | * | 6/1983 | Molnar | 293/120 |
| 4,642,954 | A | * | 2/1987 | Sigerist | 52/204 |
| 4,700,977 | A | * | 10/1987 | Hlavach | 293/126 |
| 4,870,791 | A | * | 10/1989 | Nelson | 52/217 |
| 4,873,804 | A | * | 10/1989 | Kukke | 52/217 |
| 4,875,728 | A | * | 10/1989 | Copp et al. | 293/126 |
| 4,948,637 | A | * | 8/1990 | Kessler | 428/31 |
| 5,075,917 | A | * | 12/1991 | Wheat et al. | 15/161 |
| 5,154,462 | A | * | 10/1992 | Carpenter | 293/120 |
| 5,491,940 | A | * | 2/1996 | Bruchu | 52/213 |
| 5,669,704 | A | * | 9/1997 | Pastrick | 362/83.1 |
| 2002/0043041 | A1 | * | 4/2002 | Yoyasu | 52/716.5 |

FOREIGN PATENT DOCUMENTS

| | | |
|---|---|---|
| DE | 42 17 513 A1 | 12/1992 |
| DE | 295 02 439.9 | 5/1995 |
| DE | 197 18 531 C1 | 6/1998 |
| EP | 0337884 | 10/1989 |
| EP | 0914990 A1 | 5/1999 |

(Continued)

OTHER PUBLICATIONS

Ornamental or guard strap for vehicles; Abstract, May 10, 1999; 15.34; 2 pp.

*Primary Examiner*—Lanna Mai
*Assistant Examiner*—Phi Dieu Tran A
(74) *Attorney, Agent, or Firm*—Barnes & Thornburg

(57) ABSTRACT

A moulding element for motor vehicle bodies has been realized wherein a main section bar (2) of elongated conformation is engaged to attachment projections (9) presented by a correspondent securing area (5a) of a body (5) of a motor vehicle. The engagement between main section bar (2) and body (5) occurs by means of the interposition of a continuous support element (7) presenting a pre-set number of seats (11) able to be engaged to a pre-set number of fastening projections (9) of the body.

13 Claims, 3 Drawing Sheets

FOREIGN PATENT DOCUMENTS

| | | |
|---|---|---|
| EP | 0924121 A1 | 6/1999 |
| JP | 113748 * | 6/1985 ................ 52/716.6 |
| JP | 166417 * | 6/1992 ................ 52/716.6 |

* cited by examiner

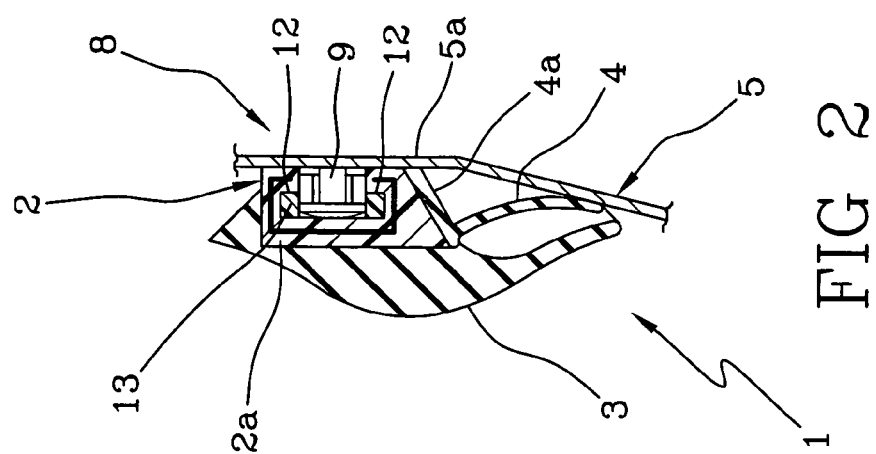
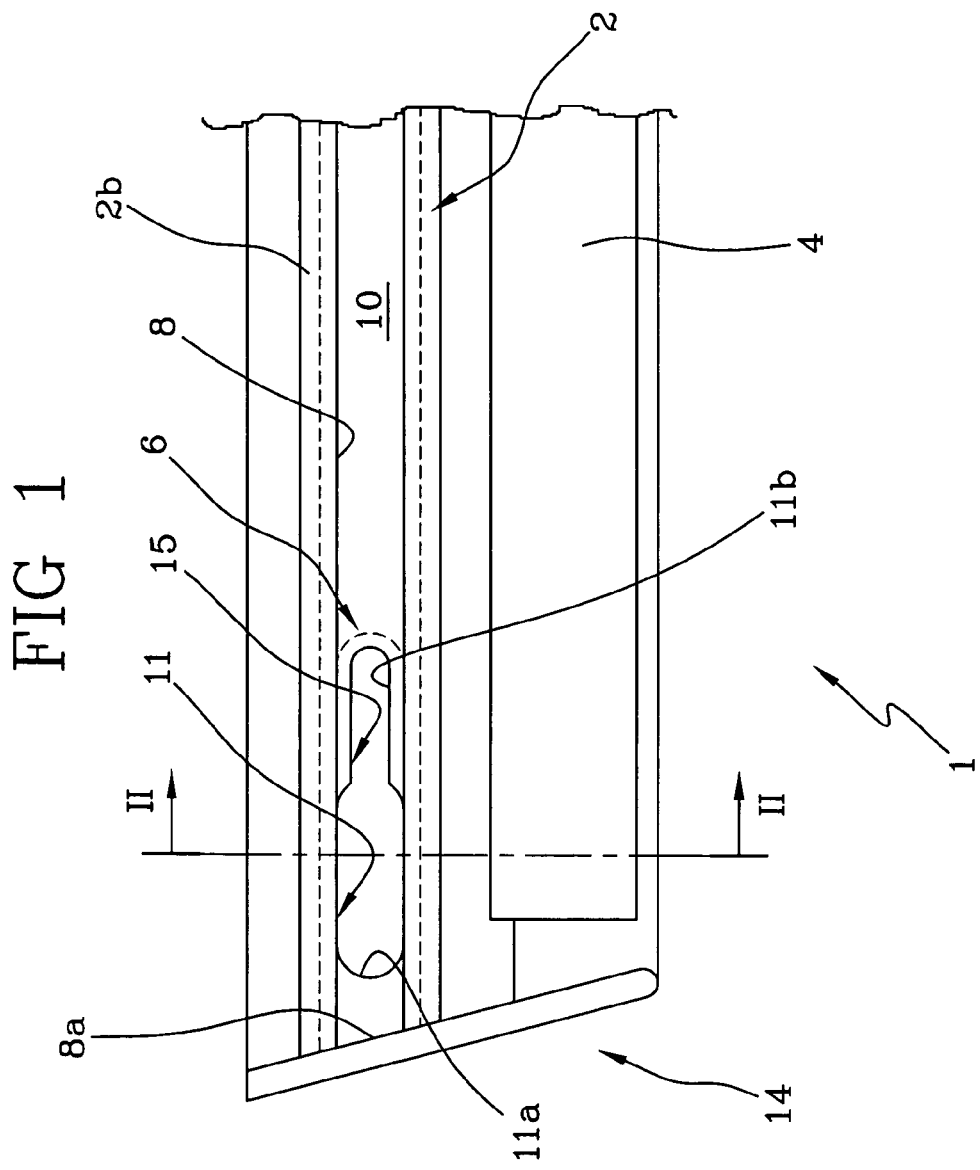

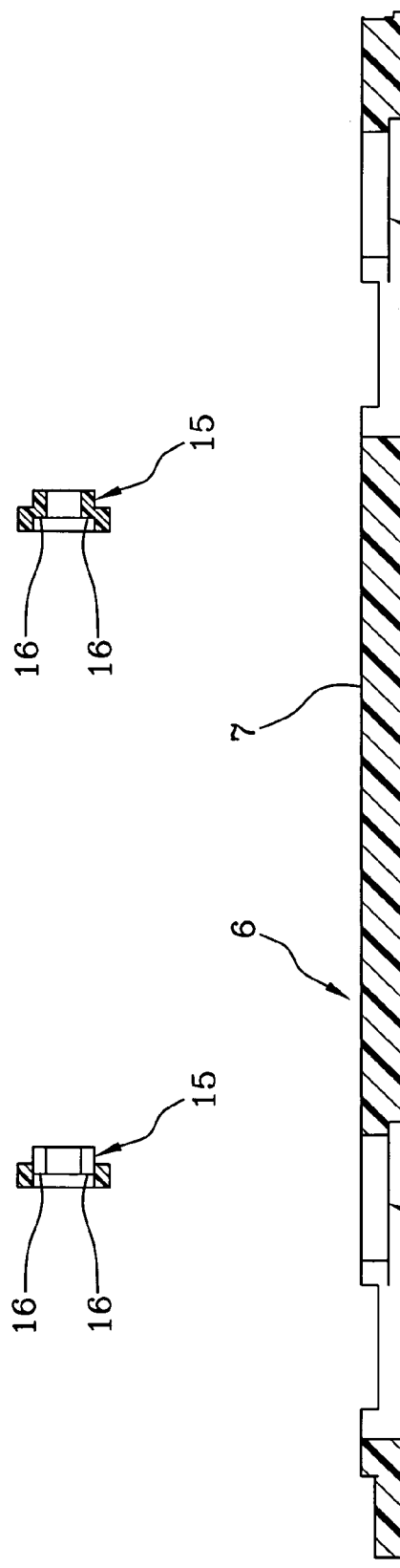
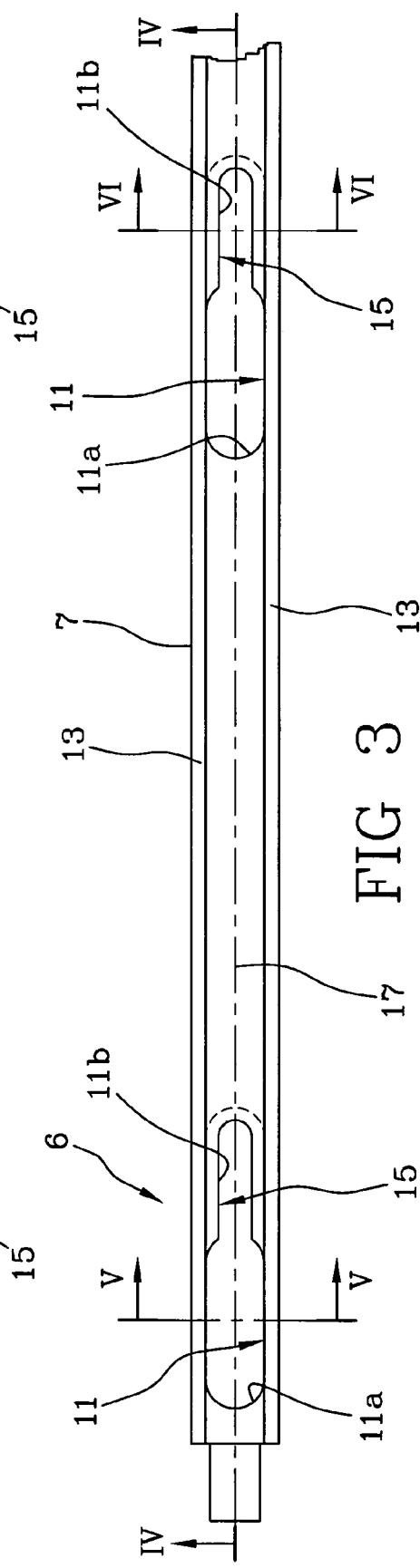

MOULDING ELEMENT FOR MOTOR VEHICLE BODIES AND METHOD FOR REALIZATION THEREOF

The present invention relates to a moulding element for motor vehicle bodies and a method for the realisation thereof.

In particular, such a moulding element is destined to be applied as a finish and/or protection to car body parts (e.g.: doors, fenders, edge areas of the lower perimeter of the body, windshields, etcetera).

Moulding elements of known types for the uses cited above usually comprise a band, typically made of plastic material, provided with proper attachment means for engagement to some part of the body.

It is also known from EP 0461576 a single piece moulding element, provided on its inner surface with slots properly shaped to engage projections emerging from the body.

Some known types of moulding elements provide for the plastic band to be fastened by means of adhesives (e.g.: bi-adhesive tapes interposed between the body and one side of the moulding element).

The drawbacks of this kind of fastening are clear: precariousness of the connection, unreliability over time, extreme sensitivity to atmospheric agents and to dynamic stresses.

A second known type of general architecture for moulding elements provides for the presence of a longitudinal seat destined to house, by snap-on engagement, a plurality of coupling elements which are positioned in the longitudinal seat in mutually equidistant positions.

More precisely, the moulding element comprises an elongated main body, obtainable by means of extrusion or moulding, wherein the longitudinal seat is defined. The latter, on the side of the moulding element destined to be oriented towards the body, presents an opening or slot wherefrom the coupling elements can partially emerge. More specifically, in correspondence with the opening or slots, millings or blankings are obtained at regular intervals in order to allow the insertion of each of the coupling elements and, at the same time, to define axial bearing surfaces wherein the coupling elements go and get locked by snapping.

Once the various coupling elements are appropriately fastened, they will each present at least a projection emerging in a direction substantially perpendicular to the longitudinal seat to engage corresponding slots obtained on the body of the motor vehicle.

This prior art realization, though it is certainly effective from the point of view of fastening and operative reliability, nonetheless also has considerable drawbacks.

In particular the need to provide millings for the access of the engagement elements in correspondence with the longitudinal seat clearly entails an additional working phase which causes non negligible manufacturing costs. Moreover, since the main body whereon the milling is performed is typically made of material having good mechanical characteristics and, oftentimes, even of bi-material, milling operations are certainly not easy.

It should also be noted that the milling or blanking operations cause significant weakening in the structure constituting the moulding element thereby inevitably causing deformations and in particular undulations, certainly antiaesthetic, which reduce the planarity and compliance with geometric tolerances of the outer surface of the moulding element itself. In fact, given the extreme rigidity of the section bar and the presence, in many cases, of metal cores, the milling work processes may entail such maintenance problems to the abrasion elements as to determine high machining costs and scrap levels.

Moreover, the residual presence of possible burrs can determine abrasions and scoring on the painted parts of the body.

In the attempt to solve the aforementioned drawbacks, a third type of moulding elements is currently widely used, wherein the attachment means comprise rivets or projections fastened, for instance by welding, to the body of a motor vehicle and then appropriately coated with plastic material in order to be engageable, by interference or by snapping on, in corresponding seats of the moulding element.

In greater detail, each rivet of the body is provided with its own plastic retaining element presenting a seat able to receive, by means of insertion in the vertical direction, the head of the rivet.

Each retaining element is also provided with guiding portions with horizontal development located on the same element in opposite positions.

Once each head of the rivets is engaged with the corresponding retaining element, a "C" section bar is associated by sliding, which engages on the guiding portions and covers the retaining elements themselves. By means of terminal bodies the axial sliding movement between section bar and retaining elements is subsequently prevented.

This last realization although it does eliminate the burdensome problem of the milling operation, is also afflicted by some drawbacks.

In the first place it should be noted that it is not possible to manufacture a finished product ready to be assembled to the body of the motor vehicle.

This is because the assembly phases entail first associating all the retaining elements to the respective rivets.

Secondly, it is necessary to engage, by means of sliding, the extruded element to each of the retaining elements, and hence an additional phase wherein the section bar is axially locked is necessary.

This means that mounting each moulding element requires numerous successive phases and that prior to proceeding with assembly to the body, each moulding element must be finished in multiple separate pieces.

It should also be noted that the presence in the finished product of a plurality of discrete elements (retaining elements) physically separated from each other, coupled with the weakness of the section bar structure, due to the presence of hollow lightening areas, contributes to render the final structure of the moulding element weaker and more easily deformable.

In this situation, the fundamental aim of the present invention is to make available a new embodiment of a moulding element for motor vehicle bodies which, in addition to presenting high performance in terms of resistance and reliability over time of the fastening to the body, is also economical to manufacture and easy to assemble, without thereby entailing substantial increases in terms of materials consumption.

A further aim is to avoid the need for milling operations on the extruded section bar and provide a moulding element able to be associated to the body of a motor vehicle, by the simple method of engaging each of the rivets emerging from the body of the motor vehicle to a corresponding seat with a single attachment operation.

Within the scope of said technical task, an aim is to provide motor vehicle manufacturers with an already pre-assembled moulding element, requiring only to be fastened to the motor vehicle.

Lastly, a further aim is to render the moulding element able to be fastened to the body in a more resistant and reliable manner.

These and other aims besides which shall be made clearer in the course of the following description are substantially attained by a moulding element as described in the accompanying claims.

Further features and advantages will become more readily apparent from the detailed description of a preferred, but not exclusive, embodiment of a moulding element according to the invention.

A non-limiting example of the invention is given by way of the below detailed description and accompanying drawings.

FIG. 1 is an interrupted plan view relating to the body coupling side of a moulding element according to the present invention;

FIG. 2 is a cross section taken along view lines II—II of FIG. 1;

FIG. 3 is an interrupted top view of a continuous support element according to the invention;

FIG. 4 shows a longitudinal cross section according to the axis IV—IV of the continuous support element shown in FIG. 3;

FIG. 5 is a cross section of the continuous support element of FIG. 3 taken along view lines V—V of FIG. 3;

FIG. 6 is a cross section of the continuous support element of FIG. 3 taken along view lines VI—VI of FIG. 3;

Figure 7:
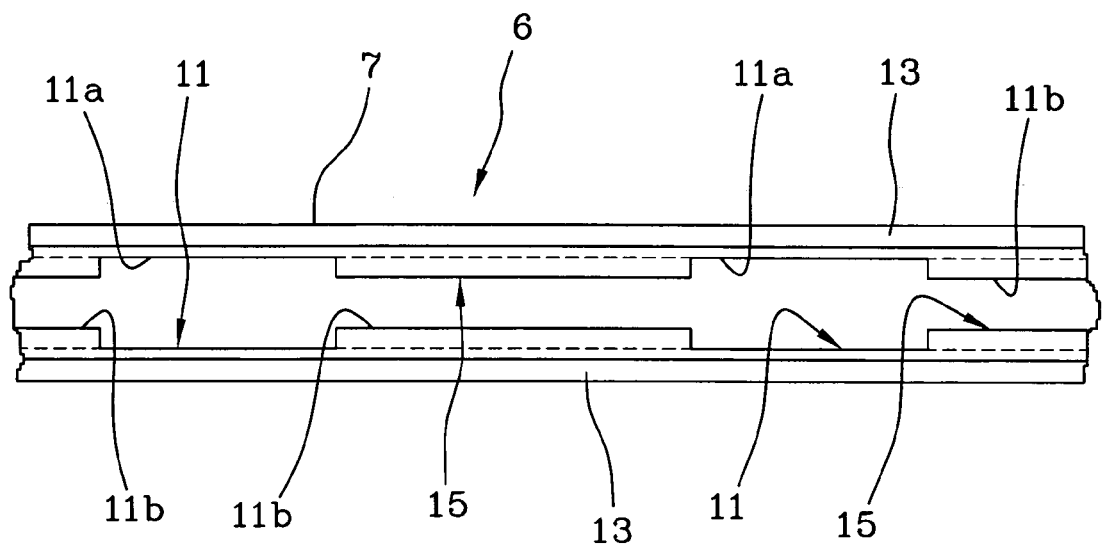
FIG. 7 shows an alternative embodiment of a continuous support element according to the present invention.

With reference to the accompanying figures and in particular to FIGS. 1 and 2, the number 1 indicates in its entirety a moulding element of motor vehicle bodies.

As mentioned above the moulding element 1 may be employed as an element for protecting, for surface and aesthetic finishing, for covering in various areas of the body of a motor vehicle, for instance in correspondence with the lower edge of the body on the sides thereof, in correspondence with the front and rear fender, on the doors, on the windshield, etcetera.

The moulding element 1 comprises a main section bar possibly provided with metal core presenting elongated conformation and obtainable for instance by means of extrusion or pultrusion or other processes.

The main section bar presents an outer side 2a whereto is associated a surface finish coating 3 which can preferably be joined to the main section by means of injection moulding techniques or by co-extrusion with the main section bar. The surface finish coating 3 needs to be rigidly coupled to the main body itself. Preferably, but not necessarily, the main section bar can also be provided with a flexible seal lip 4 extending substantially along the entire longitudinal development of the moulding element 1 and presenting a base portion 4a rigidly engaged to the main section bar 2. From a manufacturing point of view, the coupling between the main section bar 2 and the seal lip 4 can be obtained with various techniques, for instance by means of their co-extrusion effected continuously.

In order to engage the main section bar 2 and thus the moulding element 1 to a corresponding attachment area 5a provided with fastening projections 9 welded to the body 5 of the motor vehicle, attachment means 6 are provided, operatively associated to the main section bar itself in correspondence with an inner side 2b thereof, opposite to said outer side 2a.

In detail, the fastening projections 9 comprise a pre-set number of elements each provided with a head connected to the body 5 by means of a stem with smaller radial dimensions than those of the head, resembling the shape of a rivet.

Originally, the attachment means 6 comprise a continuous support element 7, extending substantially over the entire longitudinal development of the main section bar 2 and fastened thereto preferably by means of insertion in a corresponding longitudinal seat 8 obtained on the inner side 2b of the main section bar itself.

Descending further in detail, it should be noted that the longitudinal seat 8 is defined by the main section bar which presents a substantially "C" shaped cross section The seat is obtained on the main section bar 2 and it presents, in its cross section, a longitudinal opening 10, also substantially developing over the entire length of the moulding element, set to allow an access to the continuous element 7 when the latter is inserted.

Also in reference to the cross section, the longitudinal seat 8 presents at least an undercut 12 set to act in opposition against a corresponding bearing portion 13 of the continuous support element 7 to prevent its extraction through the longitudinal opening itself. It should be noted that, in the example shown, for reasons of symmetry, two undercuts 12 are preferably provided, co-operating with respective bearing portions 13. In practice, both the continuous support element 7 and the longitudinal seat 8 present, at least for pre-set lengths, a greater transverse size than that of the longitudinal opening 10 so that the continuous support element 7 can be housed in its seat 8 without being extractable therefrom through the longitudinal opening 10.

Actually, to allow the attachment means 6 to be coupled to the main section bar 2 during the assembly phase, it is provided for the longitudinal seat 8 to present, in correspondence at least with one of its ends, an insertion opening 8a to receive the continuous support element 7 which can traverse the insertion opening itself and can be made to slide in the seat 8 until reaching the desired axial positioning. Once the attachment means 6 are suitably positioned with respect to the main section bar 2 the continuous element is fastened axially by means of axial locking means 14 (FIG. 1) operatively interposed between the main section bar itself and the continuous support element, More specifically, such axial locking means can comprise conventional locking mechanisms for instance of the threaded kind or a slot, the latter being provided for instance with dovetail undercut, designed to receive a corresponding portion integral to the main section bar. Note that in the embodiment shown the finish coating 3, once rigidly associated to the main section bar 2, will present a potion destined to be inserted in the axial locking slot obtained on the continuous support element to lock it in the axial sense. With reference now to the particular structure of the attachment means 6, it should be noted that the continuous support element 7 presents a pre-set number of attachment seats 11 (in particular more than one seat and in general in a number equal to that of the projections) positioned at a preset mutual distance. The seats 11 are distanced correspondingly to the distance between the fastening projections 9 presented by the motor vehicle body and are provided with means for axially locking the head of the projections 9.

In a first embodiment shown in FIGS. 1 through 6, each seat 11 is a through seat and it is delimited, at least in one side of the continuous element 7 destined to face the body, by a peripheral lip defining a closed line. Such peripheral lip defines at least an area of insertion 11*a* so conformed as to allow the passage of the head of the projections 9 traversing the continuous element 7. The lip also defines a second blocking area 11*b* of such dimensions as to allow the passage of only the stem of the rivet 9, preventing the head of the rivet from axially crossing through, moving away from or towards the body.

Once the head of the rivet 9 has been inserted in the insertion area 1*a* according to a direction that in the figures shown is axial (but which may coincide with any other direction), the rivet is moved in the blocking area of the seat wherein the moulding element is prevented at least from moving in axial direction away from the body.

In correspondence with the blocking area the peripheral lip presents a projecting portion 15 which defines at least an undercut 16 set to act in opposition with the corresponding arresting portion of the head of the projection 9 to prevent the aforementioned displacements.

From a procedural point of view, coupling to the motor vehicle occurs by simultaneously inserting all the heads of the fastening projections 9 through the first zone 11*a* of the engagement seats 11 and then effecting a translation of the moulding element according to a direction parallel to the axis of longitudinal development 17 of the section bar, thus bringing the heads to interfere with the continuous support element 7 in correspondence with the second area 11*b* of the seats.

In this situation any force directed to separate the moulding element from the wall of the vehicle brings the bearing portion of the head to interfere with the undercut 16 of the seat thereby preventing detachment.

Figure 8:
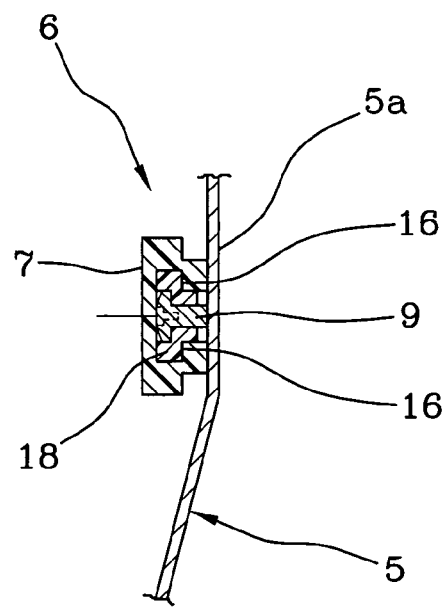
FIG. 8 shows a cross section of the continuous support element of FIG. 7 engaged to a projection emerging from the body of an automobile.

A second embodiment, shown in FIGS. 7 and 8, provides for the presence on the continuous support body 7 of seats 11 delimited by an open profile so as to be connected to the preceding seat and to the subsequent seat (excluding respectively the first and the last seat).

Also in this configuration the seats are provided with two areas, one 11*a* destined to the insertion of the head of the rivet and one 11*b* destined to interdict the separation movement of the moulding element from the body. The blocking area 11*b* is also provided with undercuts 16 acting in opposition against the head of the rivet 9 once the parts have been assembled.

The assembly and operation of this second type of continuous element conforms absolutely to the one described above.

It should be noted that the need to realize different types of elements can be linked for instance to the fact that sometimes the projections of the motor vehicle are covered by means of coating clips 18 (see in particular FIG. 8) which increase and modify the dimensions and geometry of the attachments thereby forcing the use of seats of different kinds. Obviously, by appropriately varying the dimensions, also the first type of continuous elements can be adapted for use even in case of employment of clips for coating the rivets.

Lastly, from the point of view of the materials, it should be noted that the continuous support element 7 can be realized, for instance by means of moulding or by means of extrusion and subsequent removal of material, with:
  polyoxymethylene;
  acetal resins;
  reinforced polyamides;
  thermoplastic or heat-hardening materials possibly reinforced with fibres of various nature, suitable for the purposes;
  metal alloys.

In turn, the main section bar 2 and the coating 3 can be realized respectively of extruded PVC compounds with metal core or fibres, or any other thermoplastic or heat-hardening material or cured rubbers suitable for the purpose, reinforced with fibres or metal cores or not so reinforced, as well as for instance soft PVC compounds the better to absorb any impacts, or any other thermoplastic or heat-hardening material or cured rubber suitable for the purpose.

The realization of a moulding element according to the invention entails a phase wherein a "C" shaped section bar 2, possibly incorporating a reinforcement core, is extruded.

To the section bar 2 can be associated by means of injection moulding, or even in co-extrusion process, a finish coating 3 and/or a flexible sealing lip 4. Also prepared is a continuous support element 7 (by means of forming, by means of extrusion and subsequent milling, or by yet another technique) provided with attachment seats 11 which is engaged to the main section bar by insertion into the cavity of the section bar until reaching the desired axial position.

Lastly through the use of the axial locking means 14 described the relative sliding movements of the components comprising the moulding elements are interdicted.

At this point in the procedure, the product according to the invention is ready to be fastened to the body.

The invention attains important advantages.

In the first place, it should be noted that the moulding element according to the present invention substantially solves all the typical drawbacks of prior art while assuring effective fastening, high operative reliability as well as reduced costs both to manufacture and to assemble the various elements comprising it.

In particular, it should be noted that all the milling and/or blanking operations necessary for correctly fastening the attachment means 6 to the main section bar are substantially eliminated.

Moreover, thanks to the particular conformation of the continuous element 7 provided with a plurality of engagement seat, with a single operation it is possible to position such seats in correspondence with all the projections of the body with considerable savings in terms of assembly time.

In addition to its economising in construction and assembly times, the subject moulding element 1 is extremely effective also because the absence of material removal operations substantially eliminates structural weakening problems and, above all, it excludes the possibility that permanent deformations or undulations be induced on the substantially finished piece. Moreover, the particular structure of the various components allows to pre-assemble the moulding element prior to fastening it to the body, so that it can be delivered to manufacturing companies already finished and ready for application.

In conclusion, therefore, the moulding element according to the invention is obtainable at reduced costs, though it reaches a level of quality both in terms of compliance with geometric tolerances and in terms of mechanical resistance that is difficult to reach with prior art systems without prohibitive costs.

What is claimed is:

1. Moulding element for motor vehicle bodies comprising:
  a main section bar (2) of elongated conformation;
  attachment means (6) operatively associated to the main section bar (2) and destined to engage a corresponding securing area (5*a*) of a body (5) of a motor vehicle, said attachment means (6) including:

a continuous support element (7) engaged to the main section bar (2), said support element (7) presenting a pre-set number of attachments seats (11) located at a pre-set mutual distance for engagement with corresponding projections carried by said securing area (5a);

a longitudinal seat (8) on the main section bar (2) for receiving said continuous support element (7), the longitudinal seat (8) presenting in cross-section a longitudinal opening (10) to allow access to said attachment seat (11) and undercuts (12) acting in opposition on corresponding bearing portion (13) of the continuous support element (7), wherein said undercuts (12) of the main section bar (2) are capable of preventing extraction of the attachment means (6) through the longitudinal opening, said main section bar (2) and said continuous support element (7) not being made in resilient material; and a flexible seal lip (4) extending longitudinally along substantially the entire length of the moulding element itself and presenting a base portion (4a) engaged to the main section bar.

2. Moulding element according to claim 1, wherein:

said longitudinal seat (8) corresponds to said continuous support element (7), the continuous support element (7) being inserted in the corresponding longitudinal seat (8); in a first operative condition of the moulding element (1), where the continuous support element (7) is separated from the body (5), the continuous support element (7) is exclusively and directly engaged only with the main section bar (2) and, in the second operative condition of the moulding element (1) where the moulding element (1) is fully assembled and mounted on the body (5), the continuous support element is directly and exclusively attached to the main section bar (2) and to the projections (9) carried by said securing area (5a); no other attachment means being associated to the continuous support element (7) for directly attaching the support element to the body (5).

3. Moulding element according to claim 2, wherein said longitudinal seat (8) presents, in correspondence with at least one end, an insertion opening (8a) to receive said continuous support element.

4. Moulding element according to claim 1, comprising axial locking means (14) operatively interposed between said section bar (2) and said attachment means (6).

5. Moulding element according to claim 1, comprising a finish coating (3) associated to an outer side (2a) of the main section bar, said fish coating (3) being associated to the main section bar by means of injection moulding.

6. Moulding element according to claim 1, wherein said main section bar comprises a stiffening metal core.

7. Moulding element according to claim 3, wherein the main section bar (2) presents a substantially "C" shaped cross section defining within its own interior the longitudinal seat (8), said seat comprising two undercuts (12), set to act in opposition on corresponding bearing portions (13) of the continuous support element (7) to prevent the extraction of the attachment means (6) through the longitudinal opening.

8. Moulding element according to claim 1, wherein the continuous support element (7) presents a preset number of attachment seats (11) delimited at least in one side of the continuous element (7) destined to face the body, by a peripheral lip defining closed line.

9. Moulding element according to claim 8, wherein the peripheral lip delimiting the attachment seat (11) defines at least an area (11a) for the insertion of fastening projections (9) and at least an area (11b) for blocking the fastening projections (9) in an axial direction of motion of the moulding element away from the body, the fastening projections (9) of the body comprising a head and a connecting stem between the head and the body, said head presenting a radial dimension greater than the radial dimension of the stem.

10. Moulding element according to claim 9 wherein in correspondence with the blocking area (11b), the peripheral lip presents a projecting portion (15) defining at least an undercut (16) set to act in opposition on a corresponding arrest portion of the head of the projection (9) to prevent separating motions between the moulding element (1) and the body (5) of the vehicle.

11. Moulding element according to claim 1, wherein the continuous support element (7) presents a pre-set number of attachment seats (11) each delimited at least in one side of the continuous element (7) destined to face the body, by a peripheral lip defining an open line connected to the subsequent and to the preceding seat.

12. Moulding element according to claim 11, wherein the peripheral lip delimiting the attachment seat (11) defines at least an area (11a) for the insertion of fastening projections (9) and at least an area (11b) for blocking the fastening projections (9) in an axial direction of motion of the moulding element way from the body, the fastening projections (9) of the body comprising a head, and a stem connecting the head and the body, said head presenting a radial dimension greater than the radial dimension of the stem.

13. Moulding element according to claim 12 wherein in correspondence with the blocking area (11b), the peripheral lip presents a projecting portion (15) defining at least an undercut (16) set to act in opposition on a corresponding arresting portion of the head of the projection (9) to prevent separating motions between the moulding element (1) and the body (5) of the vehicle.

* * * * *